US012793013B2

(12) United States Patent
Haley et al.

(10) Patent No.: US 12,793,013 B2
(45) Date of Patent: Nov. 10, 2026

(54) SYSTEM AND METHOD FOR SELECTION OF OPTIMAL TOTE MULTIPLICITY

(71) Applicant: Dematic Corp., Grand Rapids, MI (US)

(72) Inventors: Matthew T. Haley, Raleigh, NC (US); Sunil Nakrani, Peachtree City, GA (US); Brett D. Webster, Austin, TX (US); Murat Cubuktepe, Austin, TX (US); Venkata Anil Kota, Dunwoody, GA (US); Li Wei Yap, Duluth, GA (US)

(73) Assignee: Dematic Corp., Grand Rapids, MI (US)

( * ) Notice: Subject to any disclaimer, the term of this patent is extended or adjusted under 35 U.S.C. 154(b) by 167 days.

(21) Appl. No.: 18/678,400

(22) Filed: May 30, 2024

(65) Prior Publication Data

US 2024/0403827 A1 Dec. 5, 2024

Related U.S. Application Data

(60) Provisional application No. 63/504,912, filed on May 30, 2023.

(51) Int. Cl.
*G06Q 10/00* (2026.01)
*G06Q 10/0875* (2023.01)

(52) U.S. Cl.
CPC ................................ *G06Q 10/0875* (2013.01)

(58) Field of Classification Search
CPC ......................... G06Q 10/0875; G06Q 10/087
(Continued)

(56) References Cited

U.S. PATENT DOCUMENTS

| | | | |
|---|---|---|---|
| 2015/0032252 A1 | 1/2015 | Galluzzo et al. | |
| 2018/0075402 A1 | 3/2018 | Stadie et al. | |

(Continued)

FOREIGN PATENT DOCUMENTS

| | | | |
|---|---|---|---|
| EP | 3568810 | A1 | 11/2019 |
| EP | 3824358 | A1 | 5/2021 |
| WO | 2021245138 | A1 | 12/2021 |

OTHER PUBLICATIONS

International Search Report and Written Opinion from corresponding International Application No. PCT/IB2024/55310, dated Oct. 18, 2024.

(Continued)

*Primary Examiner* — Rokib Masud
(74) *Attorney, Agent, or Firm* — Gardner, Linn, Burkhart & Ondersma LLP

(57) ABSTRACT

A control system for a warehouse includes a controller to control fulfillment activities of the warehouse and to issue multiplicity values for each SKU velocity class (SVC), such that each product is decanted into a selected quantity of totes for storage. The controller controls the SVC multiplicities and records operational data corresponding to the storage and fulfillment activities. The system includes an inference module which includes an SKU multiplicity control. The inference module issues a multiplicity value recommendation for each SVC to the controller when live data is received from a current state storage. The recommendation is defined by the SKU multiplicity control with respect to the live data. A training module retrains the SKU multiplicity control using the operational data to retrain and update the SKU multiplicity control and retrains the SKU multiplicity control based upon priorities for optimal operation of the warehouse.

20 Claims, 6 Drawing Sheets

(58) Field of Classification Search
USPC .......................................................... 705/29
See application file for complete search history.

(56) References Cited

U.S. PATENT DOCUMENTS

| | | | | |
|---|---|---|---|---|
| 2018/0150793 | A1* | 5/2018 | Lert, Jr. | B25J 9/0096 |
| 2019/0347606 | A1* | 11/2019 | Malecha | G06Q 10/083 |
| 2021/0182995 | A1 | 6/2021 | Cella et al. | |
| 2021/0300679 | A1 | 9/2021 | Meurer | |

OTHER PUBLICATIONS

Commonly owned pending U.S. Appl. No. 18/415,790, filed Jan. 18, 2024.

* cited by examiner

Training

SYSTEM AND METHOD FOR SELECTION OF OPTIMAL TOTE MULTIPLICITY

CROSS REFERENCE TO RELATED APPLICATION

The present application claims the priority benefits of U.S. provisional application, Ser. No. 63/504,912, filed May 30, 2023, which is hereby incorporated herein by reference in its entirety.

FIELD OF THE INVENTION

The present invention is directed to the control of storage systems in a warehouse environment for order fulfilment, and in particular to controls used to aid in selecting tote multiplicities for SKU velocity classifications.

BACKGROUND OF THE INVENTION

To configure a storage system for a fulfillment facility, many different parameters need to be considered. One of these parameters is the bottleneck that occurs when multiple orders require the same inventory tote for fulfilling respective orders in different parts of the fulfilment facility. To avoid this, customers can increase the number of totes in the storage system that contain the same product/SKU using some rule (to decide the number of totes with the same SKU). To avoid having to separately assign a multiplicity to each individual SKU, a pool of SKUs could be divided into velocity classes, where each of the SKUs in a same class have the same number of totes (i.e., a SKU multiplicity) in the storage system. However, a brute force search in simulated outcomes over a range of multiplicities for each SKU velocity class (SVC) is restricted to a small number of classifications for reasons of computational tractability, where SKU velocity is a calculation that describes how fast a given SKU is moved or picked such as with respect to a storage location.

SUMMARY OF THE INVENTION

Embodiments of the present invention provide methods, systems, and non-transitory computer-readable medium for managing storage systems of a warehouse for order fulfillment. In particular, controls are used to aid in selecting product stock-keeping unit ("SKU") velocity classifications for SKU multiplicities (quantity values for each product/SKU tote) based on current warehouse operational conditions, such that an optimal quantity of individual totes for each SKU is maintained in the storage systems. Exemplary embodiments include a method for optimizing SKU velocity classification (SVC) using a contextual bandit algorithm (or other machine learning techniques) to find an optimal level of multiplicities for each class depending on the state of the storage system. A storage system is included with inventory multiplicity and discrete inventory tote picking/retrieval capabilities. An inventory management system is also included and is responsible for storing and implementing the selected SVC combination. The SKU multiplicity control also includes a monitoring and processing platform responsible for collecting data from the warehouse and feeding it to the agent. The SKU multiplicity control also includes an exemplary contextual bandit agent solving the multiplicity problem by using a combinatorial contextual bandit algorithm treating the combination of multiplicities as the combinatorial solution, the warehouse fill rate as the context, and each SVC multiplicity as a multi-armed bandit. The algorithm consists of a training module (for initial training and retraining) and an inference module. An initial training loads historical facility data from a memory module and simulates the warehouse context to train the agent. Retraining is initialized from a periodic or condition-based trigger and real facility data is fed to the training module. The inference module utilizes the deployed model by fetching the current state of the system from a digital twin and applies the model to receive the optimal SVC multiplicity combination.

A fulfillment control system for a warehouse including a controller, a memory holding operational data, a current state storage holding live data for a current state of the warehouse, an inference module, and a training module. The controller controls fulfillment activities of the warehouse and issues multiplicity values for each SKU velocity class (SVC), such that each product is decanted into a selected quantity of totes for storage. The controller adaptively controls the SVC multiplicities and records operational data corresponding to the storage and fulfillment activities. The current state of the warehouse is defined by selected portions of the operational data. The inference module includes an SKU multiplicity control, e.g., an algorithm or other control process. The inference module issues a multiplicity value recommendation for each SVC to the controller when live data is received from the current state storage. The multiplicity value recommendation is defined by the SKU multiplicity control with respect to the live data. The training module retrains the SKU multiplicity control using machine learning. The training module performs the machine learning using the operational data and simulation to retrain and update the SKU multiplicity control and retrains the SKU multiplicity control based upon a plurality of priorities for optimal operation of the warehouse.

A method for controlling product storage and order fulfillment in a warehouse includes controlling fulfillment activities in the warehouse. Product decanting orders are issued to decanters. The product decanting orders comprise SKU multiplicity values for each SKU velocity class (SVC). The SKU multiplicity values for each SVC are adaptively controlled. Operational data is recorded that corresponds to the fulfillment activities in the warehouse. The operational data is held in a memory module. Live data is held in a current state data storage. The live data corresponds to a current state of the warehouse defined by selected portions of the operational data. A SKU multiplicity value recommendation is issued when a set of live data is received from the current state data storage. The SKU multiplicity value recommendation is defined by a SKU multiplicity control with respect to the set of live data. The SKU multiplicity control is retrained using machine learning techniques. The machine learning is performed using the operational data to retrain and update the SKU multiplicity control. The retraining is based upon a plurality of priorities for optimal operation of the warehouse.

In an aspect of the present invention, the training module is operable to retrain the SKU multiplicity control by providing the control with a plurality of SKU multiplicity values for each SVC for the SKU multiplicity control to coordinate and arrange the desired tote multiplicity value for each SKU in each SVC for product decanting to storage and fulfillment in a simulation. The SKU multiplicity value for each SVC is based upon operational data stored in the memory module. The training module may award numerical penalties and positive rewards based upon evaluated results of the corresponding products decanted into selected quantities of totes for storage and the completion of fulfillment activities. The penalties and rewards may be positive and negative weighted factors, such as y discount factors, for the evaluated results.

In another aspect of the present invention, the operational data is at least one of: operational data recorded during performance of operational tasks within the warehouse; order profiles and inventory snapshots from the warehouse; and simulated data generated from historical inputs meant to mimic warehouse operations.

In a further aspect of the present invention, the SKU multiplicity values for each SVC correspond to a historical time duration of decanting of corresponding products for storage and fulfillment activities completed during that time duration. In an exemplary embodiment the time duration may be an operational day that may comprise or encompass a shift or all shifts on a given day.

In another aspect of the present invention, the SKU multiplicity values for the SVCs correspond to a hypothetical time duration's quantity of corresponding products decanted into selected quantities of totes for storage and fulfillment activities completed during that time duration. The time duration may be an operational day.

In a further aspect of the present invention, the warehouse comprises at least one storage system configured for storing the totes containing the decanted products. Each of the at least one storage system is configured to provide access to the stored totes for order fulfillment activities after the decanting.

In an aspect of the present invention, the plurality of priorities for optimal operation of the warehouse comprises at least one of: maintaining the total quantity of totes in storage below a maximum value threshold, and balancing a storage fill rate against episode length. The storage fill rate and the episode length are opposing and result in opposing negative penalties.

In another aspect of the present invention, the controller is operable to direct the training module to retrain the SKU multiplicity control after a selected time interval or when a measured metric is determined to be outside of an operational window.

In a further aspect of the present invention, the SKU multiplicity values for tote multiplicities are for product decanting by decanters. The decanters are human decanters and/or robotic decanters.

A non-transitory computer-readable medium including one or more instructions which, if executed by a controller, cause the controller to perform operations including receiving operational data from a warehouse system, the operational data comprising historical data and real-time data, the warehouse system facilitates the decanting of corresponding product(s) in a selected quantity of totes for storage. A multiplicity artificial intelligence (AI) model issues SKU multiplicity values for each SKU velocity class (SVC) based on the operational data. The multiplicity AI model comprises at least one or more of a context bandit algorithm, a multi-armed bandit (MAB) algorithm, or a machine learning algorithm and is retrained by using the operational data to retrain and update an SKU multiplicity control that defines the SKU multiplicity value recommendation.

In an aspect of the disclosure, the controller updates the SKU multiplicity control and retrains the SKU multiplicity control based upon a plurality of priorities for optimal operation of the warehouse system.

The non-transitory computer-readable medium may further operate to retrain the SKU multiplicity control by providing the control with a plurality of SKU multiplicity values for each SVC for the SKU multiplicity control to coordinate and arrange the desired tote multiplicity value for each SKU.

The present invention thus provides methods, systems, and non-transitory computer-readable medium for managing storage systems of a warehouse for order fulfillment. In particular, controls (i.e., algorithms or other control processes) are used to aid in selecting multiplicities for SKU velocity classifications based on current warehouse operational conditions, such that an optimal quantity of individual totes for each SKU is maintained in the storage systems. Each SKU will be assigned to an SVC, allowing the algorithm/control to learn optimal multiplicities. An optimal quantity of individual totes helps to prevent bottlenecks that occur when there are multiple orders requiring the same inventory totes for fulfilling respective orders in different parts of the fulfilment facility. The optimal quantity of individual totes also considers the tote capacity of the storage system(s) and maintains the total quantity of totes below a maximum quantity threshold. These and other objects, advantages, purposes and features of the present invention will become apparent upon review of the following specification in conjunction with the drawings.

DESCRIPTION OF THE PREFERRED EMBODIMENTS

The present invention will now be described with reference to the accompanying figures, wherein numbered elements in the following written description correspond to like-numbered elements in the figures. The order fulfillment industry is moving towards software intensive and intelligent, autonomous solutions. These solutions must blend fixed and mobile automation with flexible workflows and real-time end-to-end visibility of warehouses providing order fulfillment services. AI-enabled decision-making supports these capabilities. These solutions enable new business models through standalone software services (SaaS) as well as integrated architectures. On top of all this is a fulfillment control and production monitoring system, which presents multiple opportunities through decision support enabled by a digital twin (providing real-time system context), data consolidation, analytics, and standalone SaaS. Alternatively, it can be an integrated solution enabling flexible fulfillment (e.g., multi-channel fulfillment). One factor in enabling the full potential of an exemplary fulfillment control and production monitoring system is the use of specific AI/RL applications.

FIGS. 1-3 and 5 illustrate exemplary decanting and storage systems for warehouse environments or aspects thereof in which product receiving, decanting, and storage activities are taking place. It should be appreciated that receiving, decanting, and storage systems employing control systems in accordance with the present invention may be configured and employed in numerous ways and environments utilizing variously configured and differing material storage and handling systems. Accordingly, the below discussion of the systems of FIGS. 1-3 and 5 should be understood as non-limiting and provided for explanatory purposes.

Figure 1:
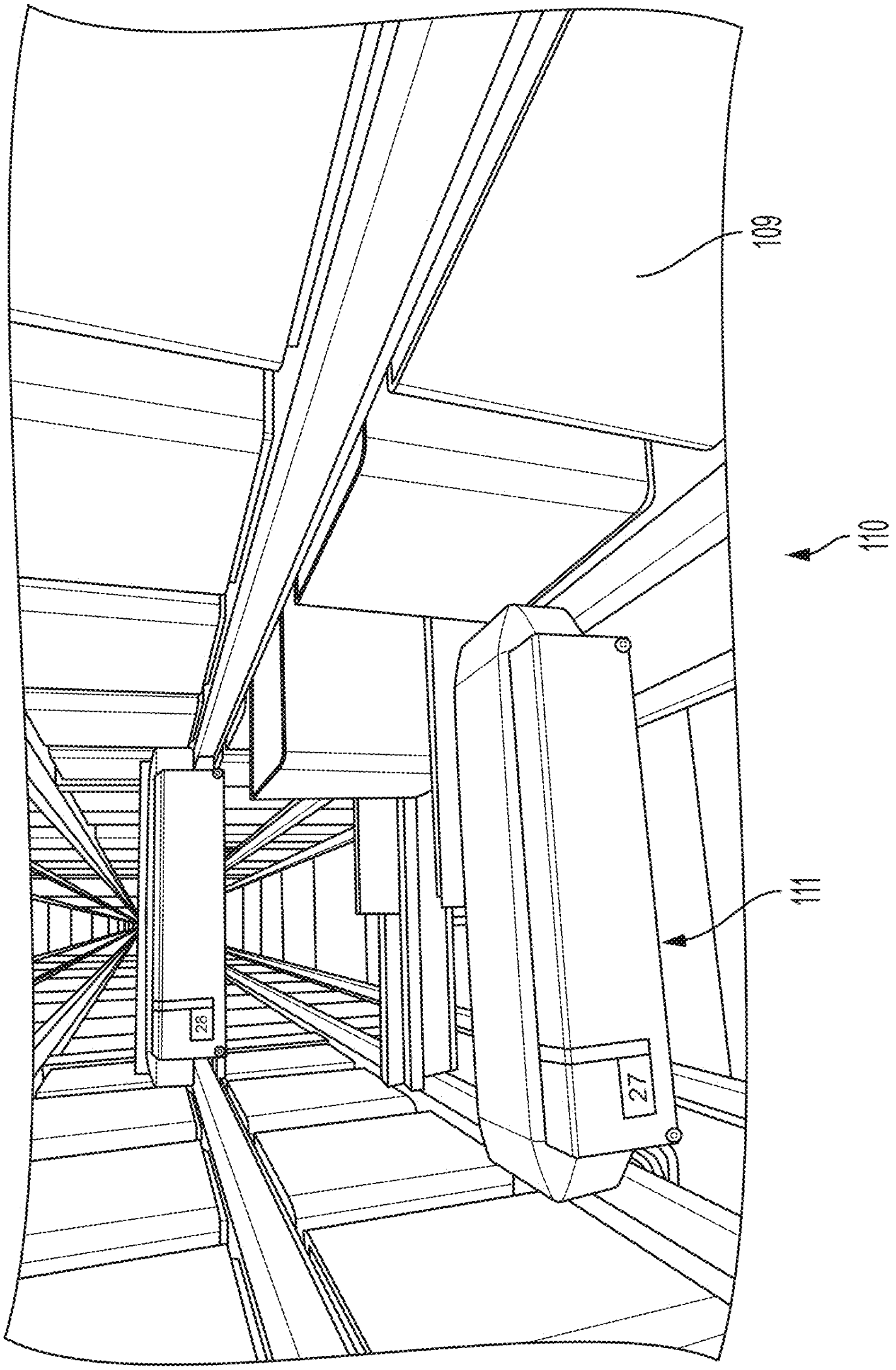
FIG. 1 is an exemplary embodiment of an automated storage and retrieval system employing totes for storage of goods that may employ a control system for order fulfillment operations in accordance with the present invention.

FIG. 1 illustrates an exemplary storage system 110 implemented as an automated storage and retrieval system (ASRS). The storage system 110 may also be implemented as other storage systems or techniques. Through aisles between tiers of stacked inventory totes 109, shuttles 111 are configured to move along the aisles to access selected inventory totes 109 for order fulfillment activities. As discussed herein, the storage system 110 is interconnected, such as by conventional conveyors, with decant stations 108 and retrieval/order fulfillment workstations 112, such that inventory totes 109 are filled with decanted products/SKUs at the decanting stations 108, transported to the storage system 110, and eventually retrieved from the storage system 110 for order fulfillment activities (at the retrieval/order fulfillment workstation 112) (see FIGS. 2 and 5).

Figure 2:
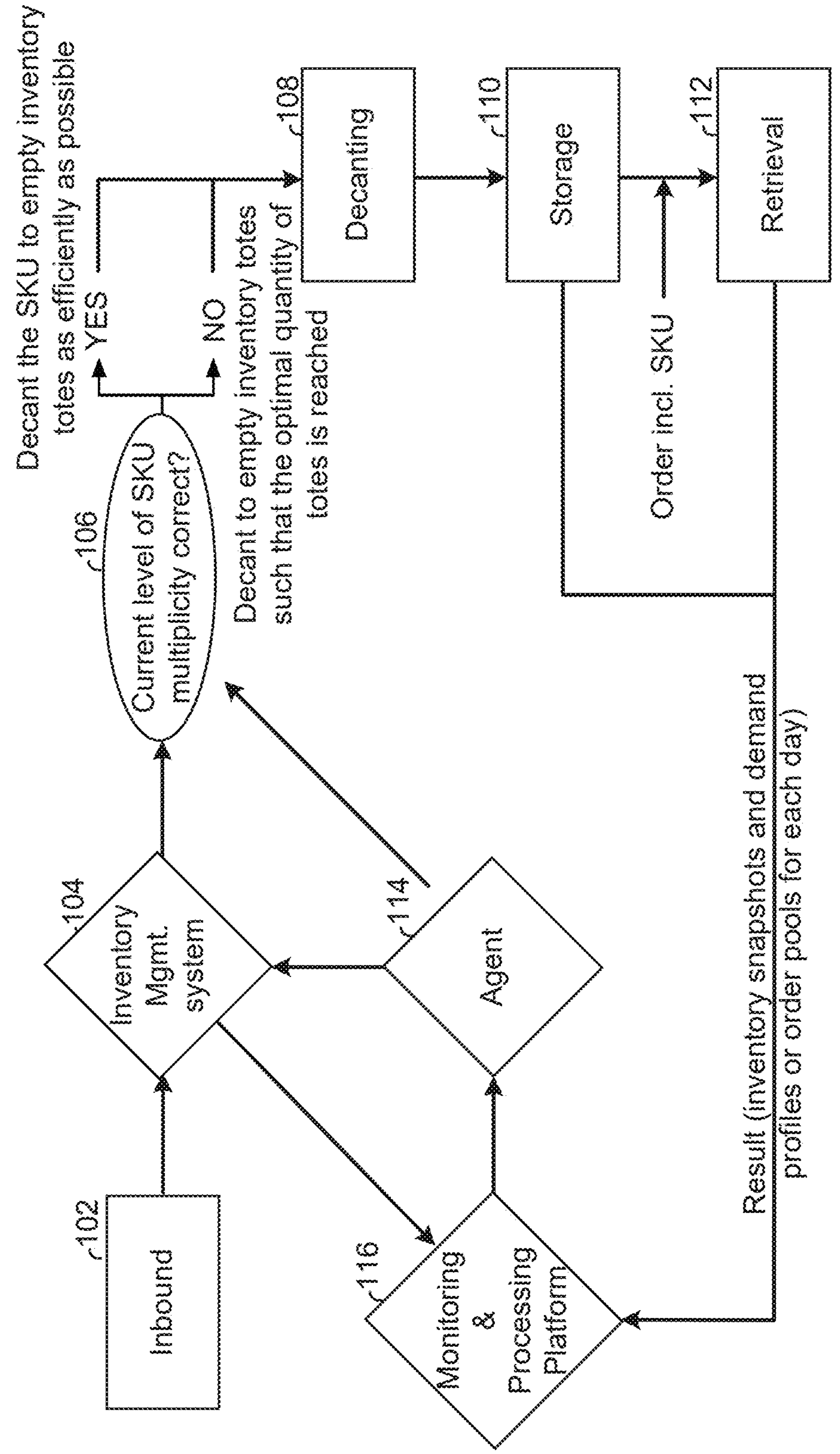
FIG. 2 is a block diagram of the storage and retrieval system and control system of FIG. 1 illustrating a process for controlling product stock-keeping unit ("SKU") multiplicities based upon current order fulfillment operational conditions in accordance with aspects of the present invention.
Figure 3:
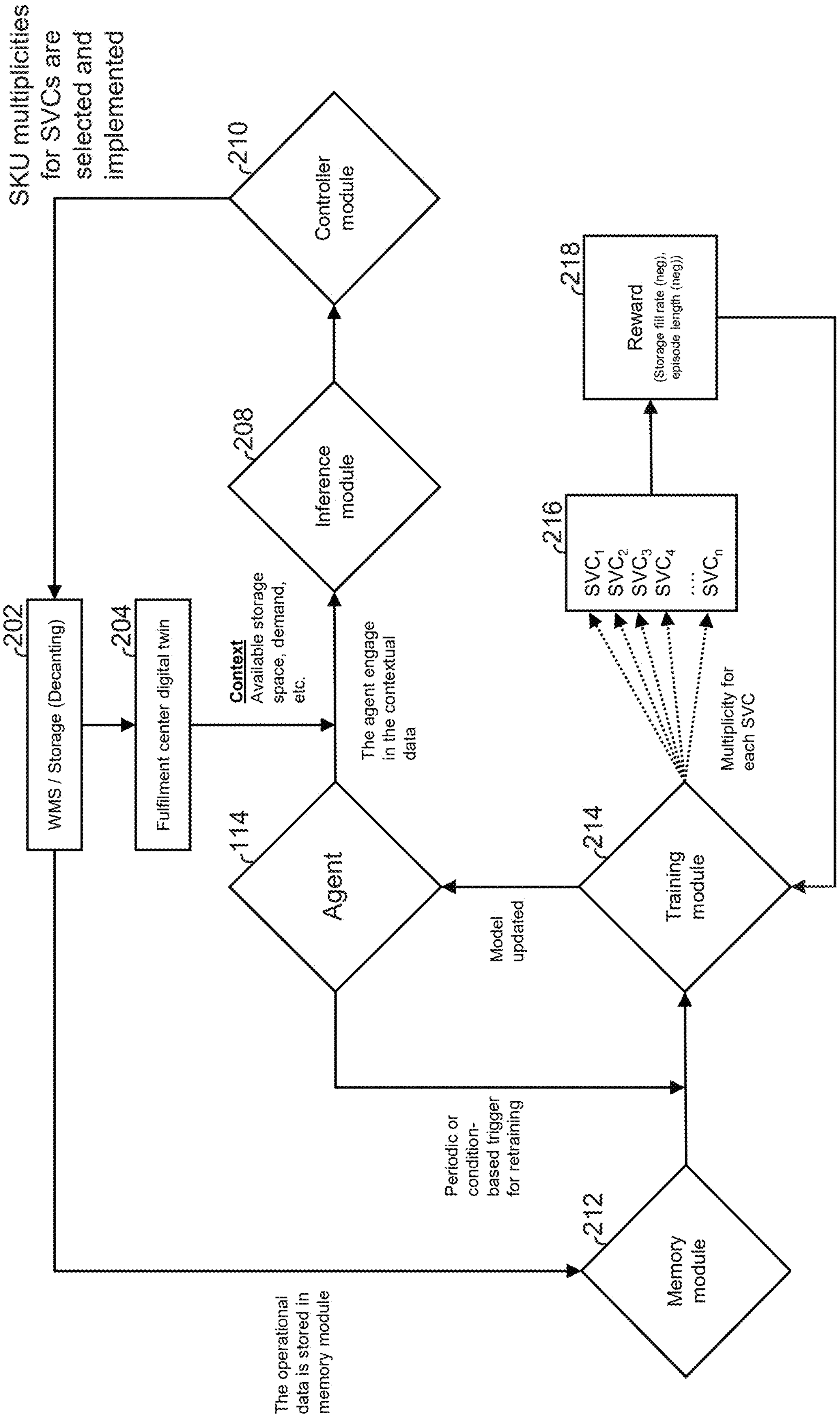
FIG. 3 is yet another block diagram of the storage and retrieval system and control system of FIG. 1 illustrating a process for training the control system in accordance with the present invention.
Figure 5:
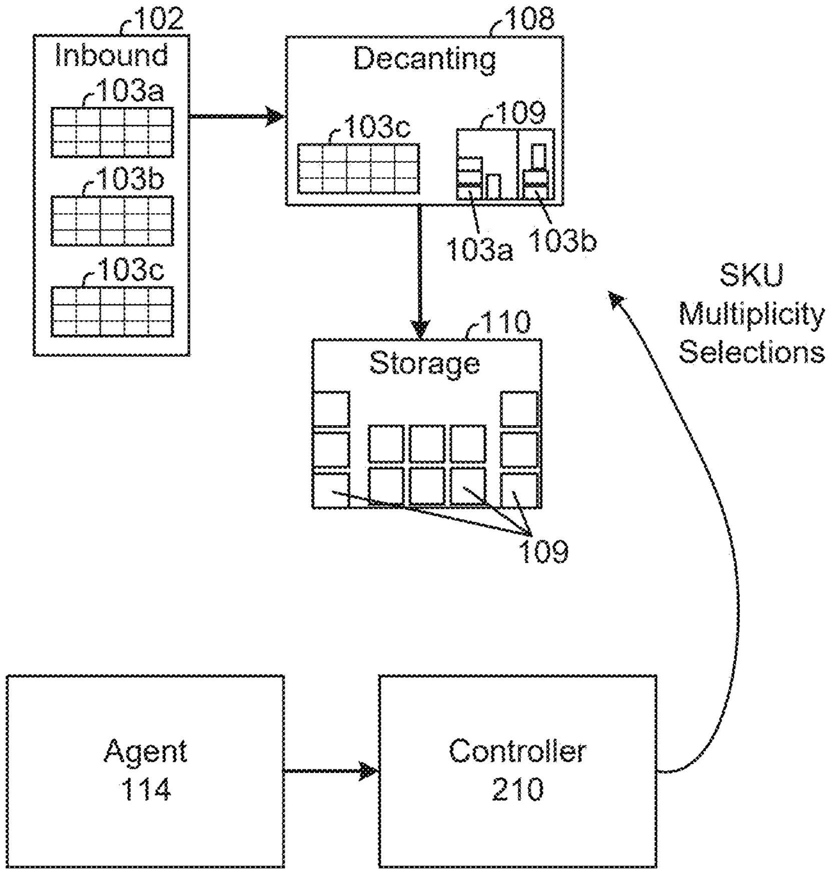
FIG. 5 is a block diagram of an exemplary decant and storage system illustrating the decanting of received products into selected quantities of totes for storage.

Referring to FIGS. 2, 3, and 5, inbound product 103*a*-*c* is delivered to a decant station 108 for decanting into totes 109, and with the filed totes 109 stored in a storage system 110. Exemplary storage systems 110 include automated storage and retrieval systems (ASRS) and other storage systems, such as rack systems for storing goods. The product 103 (each identified by a unique SKU) can be received from outside the facility environments or from local product reserves. Each tote 109 is configured for a desired partition size, e.g., single, double, and triple partition. The tote 109 illustrated in FIG. 5 is a double partition tote 109. Generally, while decanting, a selected partition of a tote 109 will be filled with as much product/SKU 103 as will fit into the partition. If there is remaining product/SKU 103 to be decanted, another empty tote 109 will be retrieved (e.g., from a local supply of empty inventory totes) and filled with the remaining product/SKU 103. While a conventional decanting process will emphasis conserving space within the storage system (by putting as many products/SKUs 103 as possible into a designated partition), such emphasis can often result in a bottleneck when multiple orders to be fulfilled require the same limited number of totes 109 with the particular product/SKU 103.

The problem is particularly acute for larger orders that will typically have many overlapping "hot" SKUs with other large orders, causing the processing of such orders to be more in serial than in parallel. A "hot" SKU is a SKU (or its represented product or item) having greater demand that is desired for multiple orders. Customers preemptively head off such SKU bottlenecks by decanting multiple inventory totes of hotter SKUs into their storage system, using an ad hoc rule of thumb for how many totes (of each SKU) to assign to each SVC. In the best-case scenario, a simulation driven by historical data would be used to verify the optimality of SVC multiplicity assignments using a brute force enumeration of multiplicity combinations. With a small number of SVCs and some foreknowledge of appropriate multiplicity ranges, this can produce better results than maximizing tote fill alone. However, in exemplary embodiments described herein, a machine learning (ML)-based approach to optimizing SKU multiplicities is used that can provide more granular multiplicity assignments than is practical using a brute force search. These embodiments also consider the effect of multiplicity on both system throughput as well as space utilization in the storage system, balancing these competing objectives while avoiding overfilling available inventory space in the system.

Accordingly, an exemplary SKU multiplicity control (e.g., the control or controller module 210 of FIG. 3) is configured to select an optimal quantity of totes 109 for a particular SKU 103 such that bottlenecks are prevented or at least minimized, while also maintaining the fill rate of the storage system 110 below an absolute fill limit for the storage system 110. For example, should a particular partition be configured to hold, for example, ten (10) products/SKUs 103*a*, the SKU multiplicity control may instruct the decanter to only place, for example, four (4) products/SKUs 103*a* within the tote 109 (see FIG. 5). Referring to FIG. 5 for a further example, the illustrated tote 109 includes a smaller partition for holding products/SKUs 103*b* and with a smaller quantity stored (i.e., three (3)) as compared to its capacity (e.g., five (5)). It should be understood that the control module 210, as well as other modules referenced below, such as a memory module 212, a training module 214, and/or inference module 208, refer to one or more interoperating software programs. Such modules may also include or operate in connection with hardware, e.g., one or more memories for storing data and software programs, a controller for controlling specific functionalities, interacting with the internal/external memory and other systems within the fulfillment system, and input/output interfaces for communicatively coupling between modules.

Context-based tote multiplicity artificial intelligence (AI) modeling and machine learning (to train the model) provides for the application of a contextual bandit algorithm, such as the multi-arm bandit algorithm (MAB), to find optimal product stock-keeping unit ("SKU") velocity classifications (SVCs) for tote multiplicities. Machine learning to train the control treats the multiplicity choices for all SKU velocity classes as a combinational decision, with the state of the storage system as the context, and individual SVC multiplicity decisions used in training the algorithm via a learning mode such as machine learning, reinforcement learning (RL) to realize a model operable to determine an optimal SKU velocity classification for tote multiplicities based upon the relevant storage system's current state.

Referring back to FIG. 5, the exemplary fulfillment control and monitoring system includes agent/model training (e.g., reinforcement learning agent, a contextual bandit learning agent, or some other learning agent implementing machine learning processes to train and retrain the SKU multiplicity control agent 114) for optimizing SKU velocity classification for tote multiplicities. Regardless of technique, the control agent 114, which may comprise an algorithmic SKU multiplicity control agent and may also be referred to as a model, is trained using data to find the optimal balance between minimizing storage space utilization and minimizing SKU demand bottlenecks. In one embodiment, the problem of deciding multiplicities is solved using, for example, a combinatorial contextual bandit algorithm (often described as a one-step reinforcement learning algorithm, as it may be independent of the state) optimizing tote multiplicities for each SKU velocity class. As discussed in detail herein, and illustrated in FIG. 5, an exemplary method or process for optimizing SKU velocity classification ("SVC") makes use of a machine learning algorithm (e.g., a contextual bandit algorithm) to find the optimal level of multiplicities for each class depending on the state of the storage system. The storage system 110 includes inventory multiplicity and discrete inventory tote picking/retrieval. An exemplary inventory management system is responsible for storing and implementing the selected SVC combination(s). An exemplary computer based data collection and processing platform (e.g., the monitoring and processing platform 116 of FIG. 2) is responsible for collecting data from the warehouse and feeding that data to the agent 114. An exemplary algorithm/agent 114 (e.g., a contextual bandit agent) solving the multiplicity problem by, for example, using a combinatorical contextual bandit algorithm treating the combination of multiplicities as the combinatorial, the warehouse fill rate as the context, and the SVC as the multi-armed bandit (MAB). As also illustrated in FIGS. 1 and 3, the system would further include a training module 214 for the agent 114 (combining both training and retraining) and an inference module 208. In embodiment, the agent 114 includes the inference module 208. The initial training loads historical facility data from memory and simulates the warehouse context to train the agent. Retraining may be initialized from a periodic and/or condition-based trigger and real facility data is fed to the training module 214. The inference module 208 utilizes the deployed model by fetching the current state of the system from a digital twin and applies the model to receive the optimal SVC combination. In some aspects, the trained AI/ML may be obtained via online and/or offline training. For offline training, the training agent may train using data from a past instance of time. The MAB algorithm may select the actions irrespective of the information representing the state.

Referring to FIGS. 2 and 5, an exemplary system and method for optimizing SKU velocity classification uses a machine learning-based algorithm (e.g., a contextual bandit algorithm) adapting the multiplicities of SKU velocity classes (SVCs) depending on the state of the storage system. The exemplary system and methods increase the system throughput by shortening order completion times while also minimizing space utilization (in the storage system). FIG. 2 illustrates a dynamic replenishment process where decanting is performed continuously, and multiplicity decisions are made accordingly. Referring to FIGS. 2, 3, and 5, inbound products/items 102, which comprise various SKUs 103, are received and processed by an inventory management system 104, which is monitored by the computer based monitoring and processing platform 116 such as to track, record and/or monitor the SKUs 103 of incoming products/items 102, as discussed further below. Given how much product/SKU 103 is to be placed into storage 110, the agent 114 provides a SKU multiplicity recommendation to the decanting system 108 with an optimal number of totes 109 for storage of the decanted SKUs 103.

A SKU multiplicity assessment 106 is performed to determine if the current levels of SKU multiplicity (for each SVC) is at or above the recommended SKU multiplicity. Stated another way, the SKU multiplicity assessment 106 determines whether the current level of SKU multiplicity in inventory plus the minimal number of additional decanted totes is sufficient, such as greater than or equal to the agent provided optimal multiplicity. If the current SKU multiplicity is at or above the recommended SKU multiplicity, then inventory totes are filled as efficiently as possible to fill as few additional totes as possible (note that the minimum quantity of totes for the same SKU has already been met). However, if the current level of SKU multiplicity is below the recommended SKU multiplicity, then additional empty storage totes 109 are filled such that the recommended SKU multiplicity is at least reached or exceeded. As noted herein, once the recommended SKU multiplicity has been reached for an SVC, the remaining SKU inventory is decanted into totes 109 as efficiently as possible to reach the minimum number of additional totes needed to store the incoming product/SKU 103 (e.g., a "default" decant logic for decanting SKUs into totes).

In one optional embodiment, the decant station 108 is configured to request and receive partially filled inventory totes 109 from storage 110 that include product/SKU quantities below the suggested maximum quantity (e.g., a tote retrieved from storage 110 could include only two (2) products/SKUs 103, but have a maximum recommended quantity of six (6)). Retrieving and filling the partially filled totes 109 to a recommended maximum quantity could be used to aid in reducing the total number of additional totes 109 above the recommended SKU multiplicity. However, such optional requesting and receiving of partially filled totes 109 (from storage 110) can be time consuming. Thus, as discussed herein, in another embodiment, decanted products/SKUs 103 are placed into empty totes 109 (no partially filled totes). Note that each product/SKU 103*a-c* has a particular partition. In one embodiment, the partition configuration is customer selectable. A further consideration includes how inventory tote partitions affect optimal multiplicity. It is possible that when a SKU shares a tote with other SKUs, that that particular SKU needs a higher multiplicity because each SKU partition in that tote contributes to the tote's overall retrieval rate (e.g., if four equally demanded SKUs are in a same tote in quarter partitions, that tote will be requested four times as often, on average, than one of the SKUs in a tote by itself).

The decanted items/products, once placed into their totes are moved to storage 110. Order fulfillment for received orders includes retrieving 112 the selected SKU totes. The monitoring and processing platform 116 has been monitoring the inventory management system's 104 decanting and fulfillment processes (e.g., receiving inventory snapshots and demand profiles or order pools for each day). Receiving historical operational data, the agent 114 may be retrained, allowing for the agent 114 to be updated to provide the optimal access of decanting and fulfillment activities to properly access the current level of SKU multiplicity. This process may also be utilized in more static inbound/outbound shifts where all decanting and multiplicity decisions are made during an inbound shift prior to an outbound shift. For example, a night shift in the fulfillment facility could be dedicated to decanting received product/items into totes, while a day shift in the fulfillment facility could be dedicated to order fulfillment.

An exemplary storage system 110 includes inventory multiplicity (e.g., multi-shuttle, automated storage and retrieval systems (ASRS), case flow rack(s) and case picking from pallet(s) embodiments) with discrete inventory tote picking/retrieval, and further includes (or adjacent to) a decanting system 108 for decanting received inventory items into empty totes (as well as optionally into partially filled inventory totes from the storage system 110. Storage system

110 embodiments do not have any restrictions on the number of totes for each product (e.g., for SKU multiplicities) other than dimensional and quantitative restrictions. Exemplary components or configurations include any sort of storage means so long as it allows for discrete decanting and retrieval; multiple SKU velocity classifications, defined as a classification and categorization of items at the SKU level depending on some measure of demand, e.g., average daily retrievals; and an inventory management system 104 embodiment responsible for storing and implementing the selected SVC multiplicity combination.

An exemplary monitoring and processing platform 116 includes a warehouse data management system for collecting and storing data generated by a warehouse execution system, and processing the collected information (partly using the machine learning algorithm, e.g., a contextual bandit agent). The monitoring and processing platform 116 provides a cloud-based centralized data interface for connected systems including on-premise and other cloud service offering, for receiving data and communication for remote systems as well as managing, configuring, and deploying on-premise agents. In one embodiment, an exemplary monitoring and processing platform 116 is a control system comprising multiple modules that are necessary to carry out the algorithm/control including a digital twin of the fulfilment center which can convey the real-time informational state of the warehouse to associated algorithms whenever predictive or prescriptive capabilities are required. The modules include a memory module for storing the operational data, an exemplary evaluation mechanism for determining when the model should be retrained, and a controller module for controlling the activities of the fulfilment center. The operational data includes data generated from operational tasks of the warehouse system. The exemplary monitoring and processing platform 116 provides a combination of quantitative historical and forecasted demand to the agent. The historical data is a surrogate if future forecasted data is not available. Forecasted data could consider unpredictable phenomena such as special promotions, new products, known upcoming orders, etc., further improving the accuracy of the agent.

A contextual bandit algorithm (e.g., the Agent 114), as an exemplary SKU multiplicity algorithm/control, is a machine learning model trained to solve the multiplicities question by, for example, treating the multiplicity choices for all SVCs as a combinatorial decision, the state of the storage system as the context, and the individual SVC multiplicity decisions as multi-armed bandits. The exemplary agent 114 dynamically tunes the multiplicities within each SVC depending on the contextual situation of the storage system. As part of its training, the agent (during training/retraining) is negatively rewarded for resulting storage fill rates as well as episode lengths. These metrics are competing objectives, so the agent's task is to learn (via machine learning) how to balance the two. For example, increasing SVC multiplicities by a certain amount may only provide marginal benefit in terms of episode length while still consuming rack space at a linear rate. The agent will eventually hone in on an optimal multiplicity threshold above which the benefits to throughput are outweighed by excessive space utilization.

As discussed herein, an exemplary agent 114 is trained by a training module 214 (providing both initial training and retraining) and an inference module 208. The training module 214 utilizes order processing data, specification(s) of the storage system, and inventory snapshots of the various times of each customer facility, and simulates the warehouse context to train the agent 114. The agent 114 is retrained if changes occur to, for example, overall volume rates in the facility or DMS reconfigurations. The agent 114 can potentially use supply chain data, short and long-term future demand (as described above) as well as adapt to seasonality. The lifecycle of the exemplary contextual bandit algorithm comprises training, inference, and a retraining trigger. The steps to exemplary methods for training, inference, and retraining are illustrated in FIGS. 4A, 4B, and 4C.

Figure 4A:
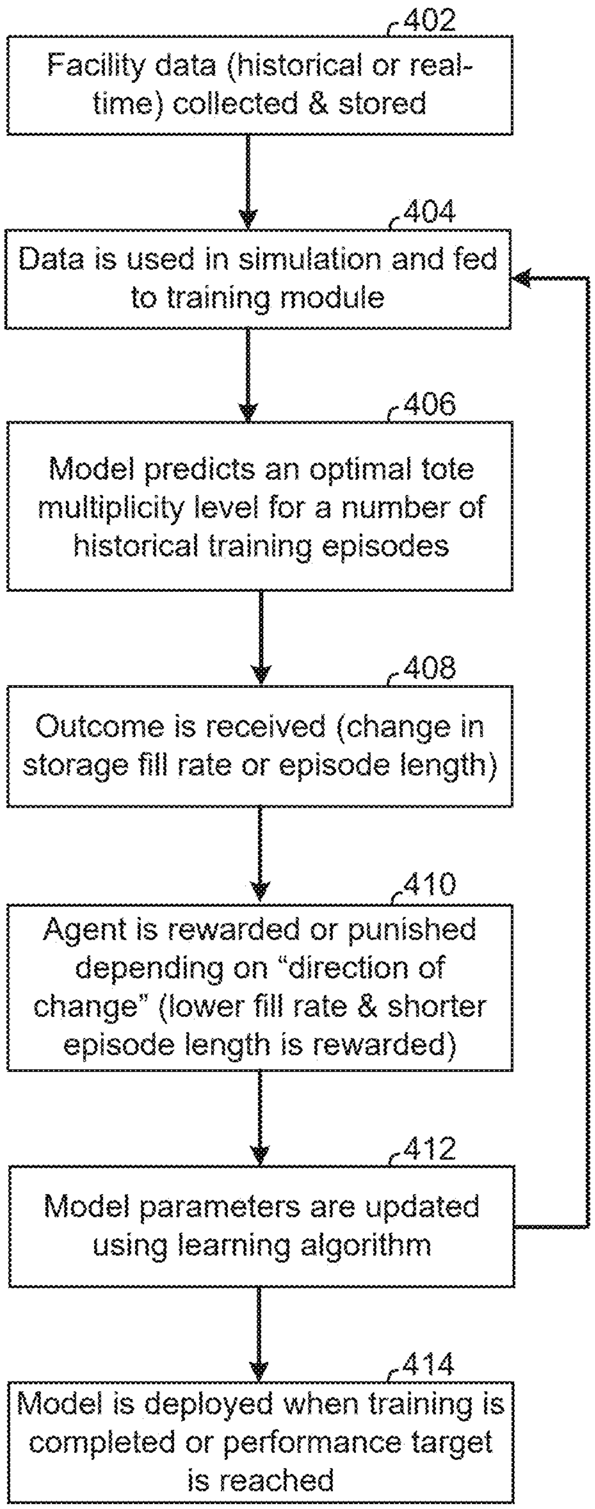
FIG. 4A is a flow diagram illustrating the steps of a method for training a SKU multiplicity control process in accordance with the present invention.
Figure 4B:
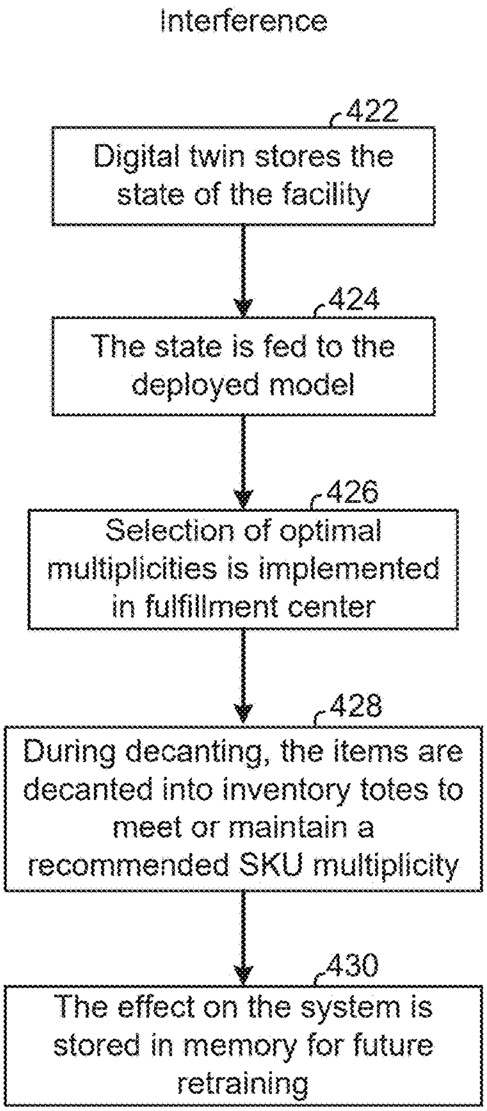
FIG. 4B is a flow diagram illustrating the steps of a method for selecting optimal SKU multiplicities based upon current fulfillment operations in accordance with the present invention.
Figure 4C:
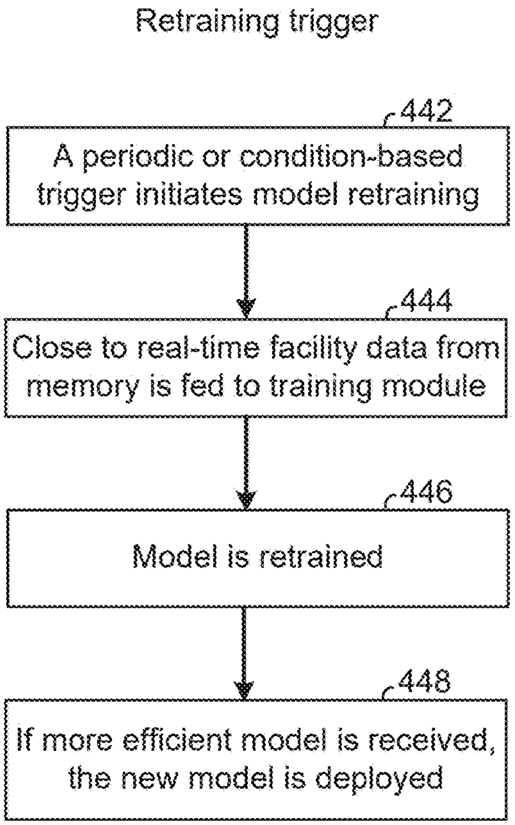
FIG. 4C is a flow diagram illustrating the steps of a method for retraining a SKU multiplicity control process in accordance with the present invention.

An exemplary method for training a SKU multiplicity model/agent begins in step 402 of FIG. 4A. In step 402 of FIG. 4A, facility data (either historical or real-time) is collected and stored in memory. In one embodiment, an exemplary data collection and processing platform, e.g. the monitoring and processing platform 116 of FIG. 2, collects, stores data, and processes the collected information, such as based on item or SKU 103 information, including associated with incoming goods 102 as well as based on items or SKUs 103 in the material handling system, including the storage system 110. In step 404 of FIG. 4A, the data is used in simulation and fed to a training module (e.g., the exemplary training module 214 of FIG. 3). In step 406 of FIG. 4A, the model/agent (being trained by the training module) makes a prediction of an optimal tote multiplicity level using a SKU multiplicity control process using facility context. In one embodiment a combinational contextual bandit algorithm is used that uses facility context. As discussed herein, one or more SKU multiplicity levels may be tested in series or as a slate of SKU multiplicity levels to be test at a time.

In step 408 of FIG. 4A, an outcome (of the prediction from step 406) is received. The outcome will include a change in the storage fill rate and/or in episode length. In step 410 of FIG. 4A, the agent is rewarded or punished depending on the "direction of change" (e.g., a lower fill rate and/or shorter episode length are rewarded) of the SKU multiplicity just tested. As illustrated in FIG. 4A, the updated model context and combination of SVCs is fed back to step 404 of FIG. 4A, such that additional episodes of training can begin with the updated model. In step 414 of FIG. 4A, a model/agent (e.g., agent 114) is deployed when an accuracy threshold is achieved.

One "episode" of the training method consists of populating inventory of a simulated storage system using a multiplicity policy and rolling out one or more days in simulation to determine the reward resulting from this policy. To initiate an episode, the method begins (in steps 402/404 of FIG. 4A) with a customer initial inventory state snapshot taken before an outbound shift begins. From this initial state, the method removes inventory lines corresponding to the simulated period's demand SKUs, then inventory for those SKUs is repopulated according to a current multiplicity policy. The method also removes a random amount of inventory of SKUs that are not present in the current simulated day's order demand so the model/agent learns to generalize over different initial states.

Referring to FIG. 4B, an exemplary inference method uses a trained model/agent deployed in the fulfillment system to provide SKU multiplicity recommendations for optimal SVCs depending on the state of the fulfillment system. In step 422 of FIG. 4B, a digital twin stores the state of the fulfillment facility. In step 424 of FIG. 4B, the facility state is "fed" to the deployed SKU multiplicity model 114. In step 426 of FIG. 4B, optimal SKU multiplicities are selected and implemented in the fulfillment facility.

In step 428 of FIG. 4B, during decanting, the products/items are decanted in selected numbers into inventory totes depending on the results of the SKU multiplicity optimization. In another embodiment, the products/SKUs are decanted into partially filled inventory totes retrieved from storage 110 depending on the results of the SKU multiplicity optimization. That is, based on the optimal SKU multiplicity level, the decanted products/items for that SKU are either placed into totes 109 such that the number of totes with the same SKU goes up (for when the optimal SKU multiplicity goes up), or are efficiently placed into totes such that the quantity of totes with the same SKU increases as little as possible (for when the optimal SKU multiplicity goes down). In step 430 of FIG. 4B, the effect on the fulfillment system is stored in memory 212 for future retraining. Such monitoring and storing in memory may, for example, be performed by an exemplary data collection and processing platform, such as the monitoring and processing platform 116 of FIG. 2.

Referring to FIG. 3, a summary of the SKU multiplicity model's training/retraining and its interactions with the fulfillment facility is illustrated. As discussed herein, and illustrated in FIG. 3, for training, an exemplary training module 214 receives data pulled from memory 212 that includes historical operational data (e.g., warehouse configuration, storage space configuration and layout, and fulfillment operational processes). Using the historical fulfillment facility data, the training module 214 generates a series of SVC multiplicity results 216, which are individually rewarded by the reward module 218 according to storage fill rate (a negative penalty) and episode length (a negative penalty). Note that a customer's storage space 110 may have an "absolute fill limit," such that while an overuse of space (in the storage 110) has a negative penalty, as the storage space usage increases (and approaches the absolute fill limit), the awarded penalty for storage space usage can increase until it reaches a high enough penalty that no further storage space will be utilized. That is, if the absolute fill limit is close, then the recommended SKU multiplicities will be conservative to prevent unnecessary additional SKU multiplicities (unless necessary to store the received products/SKUs 103). The SKU multiplicity control is prevented from selected SKU multiplicity recommendations that would surpass the absolute fill limit. While there is a minimum number of totes 109 to be filled with received product/SKUs, the SKU multiplicity control can recommend a number of SKU totes above the minimum number of totes (to further improve fulfillment/throughput and prevent bottlenecks while avoiding the storage's absolute fill limit).

The rewards (from the reward module 218) are passed to the training module 214 for further episodes. In one embodiment, the training module 214 is configured to sequentially run through each possible SKU multiplicity for each SVC. In another embodiment, the training module 214 is configured to run in parallel a slate of SKU multiplicities for each SVC.

Once the agent/model has been trained or updated, the trained or updated agent/model is passed on to the agent 114. As illustrated in FIG. 3, a fulfillment facility digital twin 204 provides contextual data (e.g., available storage space, demand, orders, etc.) to the agent 114 for an inference analysis. In one embodiment, the agent 114 and inference module 208 are separate modules. In another embodiment, the inference module 208 is a part of the agent 114. Based upon the contextual data, the agent/inference module 114, 208 provides a SKU multiplicity recommendation for each SKU class. The SKU multiplicity recommendations are passed on to the controller module 210, which uses the SKU multiplicity recommendations to guide the decanting of incoming products/items received at storage/decanting 202. A warehouse management system (WMS) 202 monitoring the decanting and fulfillment activities passes operational data to the memory module 212. As discussed herein, this operational data is provided by the memory module 212 to the training module 214 for training/retraining. As also illustrated in FIG. 3, the agent 114 is also configured to initiate retraining based on either a periodic or condition-based trigger.

Referring to FIG. 4C, a method for retraining the SKU multiplicity model/agent begins with step 442 of FIG. 4C, where a periodic or condition-based trigger is received or perceived and model/agent retraining is begun. In step 444 of FIG. 4C, real-time or near real-time fulfillment facility data and configuration data from memory is fed to the training module 214. In step 446 of FIG. 4C, the model/agent 114 is retrained with the current fulfillment facility data. In step 448 of FIG. 4C, when the retraining is complete, if the resultant model/agent is more efficient than the previous model/agent, then the new model/agent is deployed.

The controller, or controller module (which may also be referred to as a warehouse execution system (WES)), described with reference to the figures herein may generally comprise a processor configured to perform computations and control the functions of the system, including executing instructions included in computer code for the tools and programs capable of implementing methods for managing storage systems of a warehouse for order fulfillment, in accordance with some embodiments. The instructions of the computer code may be executed by the processor via a memory device or memory module. The computer code may include software or program instructions that may implement one or more algorithms for implementing one or more of the foregoing methods. The controller, the controller module, or the WES that executes the computer code can be any processor such as a digital signal processor (DSP), a general purpose core processor, a graphical processing unit (GPU), a computer processing unit (CPU), a field programmable gate array (FPGA), an application specific integrated circuit (ASIC), a microprocessor, an AI/ML processing unit, a crypto-processor unit, a neural processing unit, a silicon-on-chip, a graphene-on-chip, a neural network-on-chip, a neuromorphic chip (NeuRRAM), a system on a chip (SoC), a system-in-package (SIP) configuration, either single-core or multi-core processor, or any suitable combination of components. A virtual processor can be formed as a portion of the controller, the controller module, or the WES.

The memory device or memory module may include input data. The input data includes any inputs required by the computer code. The output device displays output from the computer code. A memory device may be used as a computer usable storage medium (or program storage device) having a computer-readable program embodied therein and/or having other data stored therein, wherein the computer-readable program comprises the computer code. Generally, a computer program product (or, alternatively, an article of manufacture) of the system may comprise said computer usable storage medium (or said program storage device).

As will be appreciated by one skilled in the art, the disclosure may be a computer program product. Any of the components of the embodiments of the disclosure can be deployed, managed, serviced, etc. by a service provider that offers to deploy or integrate computing infrastructure with respect to embodiments of the inventive concepts. Thus, an embodiment of the disclosure discloses a process for supporting computer infrastructure, where the process includes providing at least one support service for at least one of integrating, hosting, maintaining and deploying computer-readable code (e.g., program code) in a computer system including one or more processor(s), wherein the processor(s) carry out instructions contained in the computer code causing the computer system for generating a technique described with respect to embodiments. In another embodiment, an exemplary process for supporting computer infrastructure includes integrating computer-readable program code into a computer system including a processor.

Aspects of the disclosures are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, rather than relying on brute force to find an optimal level (and thus being restricted to a limited number of SVCs), exemplary embodiments provides for an improvement in storage utilization and throughput and a minimization of order completion time. The storage space utilization is minimized by preventing unnecessary multiplicity of inventory totes when throughput is not significantly boosted by higher multiplicity. The strategy is also dynamic and adapts to a current fill rate of the fulfillment system and categorizes SKUs in as many SVCs as needed. Such a solution can be unique to each customer facility and with no manual custom tailoring needed. The solution allows for the aversion of the SKU bottleneck problem by calculating optimal tote multiplicities and provides recommendations during the decant process.

Changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. An order fulfillment control system for a warehouse, the order fulfillment control system comprising:

a controller configured to control fulfillment activities of the warehouse and to issue a respective multiplicity value for each of a plurality of SKU velocity classes (SVCs) such that each corresponding product is decanted into at least a selected quantity of totes for storage, wherein the controller is configured to adaptively control SVC multiplicities and to record operational data corresponding to the storage and fulfillment activities in the warehouse, wherein a first SVC multiplicity value defines a minimum quantity of totes a corresponding first product is to be decanted into, and wherein the controller is configured to control the decanting of the first product corresponding to the first SVC multiplicity value such that the first product is decanted into empty totes for storage;

a memory module configured to hold the operational data;

a current state data storage configured to hold live data corresponding to a current state of the warehouse defined by selected portions of the operational data;

an inference module comprising an SKU multiplicity control, wherein the inference module is operable to issue a multiplicity value recommendation for each SVC to the controller when a set of live data is received from the current state data storage, and wherein the multiplicity value recommendation is defined by the SKU multiplicity control with respect to the set of live data; and a training module configured to retrain the SKU multiplicity control using machine learning techniques, wherein the training module is operable to perform the machine learning using the operational data to retrain and update the SKU multiplicity control, and wherein the training module is configured to retrain the SKU multiplicity control based upon a plurality of priorities for optimal operation of the warehouse.

2. The order fulfillment control system of claim 1, wherein the training module is operable to retrain the SKU multiplicity control by providing the control with a plurality of SKU multiplicity values for each SVC for the SKU multiplicity control to coordinate and arrange the desired tote multiplicity value for each SKU in each SVC for product decanting to storage and fulfillment in a simulation, wherein the SKU multiplicity value for each SVC is based upon operational data stored in the memory module, and wherein the training module awards numerical penalties and positive rewards based upon evaluated results of the corresponding products decanted into selected quantities of totes for storage and the completion of fulfillment activities.

3. The order fulfillment control system of claim 2, wherein the operational data is at least one of:

operational data recorded during performance of operational tasks within the warehouse;

simulation data configured to simulate warehouse operations; and synthetic data configured to mimic the operational data.

4. The order fulfillment control system of claim 2, wherein the SKU multiplicity values for each SVC correspond to a historical time duration of decanting of corresponding products for storage and fulfillment activities completed during that historical time duration.

5. The order fulfillment control system of claim 2, wherein the SKU multiplicity values for the SVCs correspond to a hypothetical time duration's quantity of corresponding products decanted into selected quantities of totes for storage and fulfillment activities completed during that time duration.

6. The order fulfillment control system of claim 1, wherein the warehouse comprises at least one storage system configured for storing the totes containing the decanted products, wherein each of the at least one storage system is configured to provide access to the stored totes for order fulfillment activities after the decanting.

7. The order fulfillment control system of claim 1, wherein the plurality of priorities for optimal operation of the warehouse comprises at least one of: maintaining the total quantity of totes in storage below a maximum value threshold, and balancing a storage fill rate against episode length, wherein the storage fill rate and the episode length are opposing and result in opposing negative penalties, wherein the controller is further configured to control the decanting of the first product corresponding to the first SVC multiplicity value such that the first product is additionally decanted into at least one tote retrieved from the storage already containing first products when the controller determines that the quantity of totes containing the first product is above a threshold value with respect to the first SVC multiplicity value.

8. The order fulfillment control system of claim 1, wherein the controller is operable to direct the training module to retrain the SKU multiplicity control after a selected time interval or when a measured metric is determined to be outside of an operational window.

9. The order fulfillment control system of claim 1, wherein the SKU multiplicity values for tote multiplicities are for product decanting by decanters, and wherein the decanters are human decanters and/or robotic decanters.

10. A method for controlling product storage and order fulfillment in a warehouse, the method comprising:

controlling fulfillment activities in the warehouse;

issuing product decanting orders to decanters, wherein the product decanting orders comprise respective SKU multiplicity values for each of a plurality of SKU velocity classes (SVCs);

decanting each corresponding product into at least a selected quantity of totes for storage, wherein a first SVC multiplicity value defines a minimum quantity of totes a corresponding first product is to be decanted into, wherein the respective SKU multiplicity values for each of the plurality of SVCs are adaptively controlled, wherein the decanting of the first product corresponds to the first SVC multiplicity value such that the first product is decanted into empty totes for storage;

recording operational data corresponding to the fulfillment activities in the warehouse;

holding the operational data in a memory module;

holding live data in a current state data storage, wherein the live data corresponds to a current state of the warehouse defined by selected portions of the operational data;

issuing an SKU multiplicity value recommendation when a set of live data is received from the current state data storage, wherein the SKU multiplicity value recommendation is defined by an SKU multiplicity control with respect to the set of live data; and retraining the SKU multiplicity control using machine learning techniques, wherein the machine learning is performed using the operational data to retrain and update the SKU multiplicity control, and wherein the retraining is based upon a plurality of priorities for optimal operation of the warehouse.

11. The method of claim 10, wherein the retraining the SKU multiplicity control comprises providing the control with a plurality of SKU multiplicity values for each SVC for the SKU multiplicity control to coordinate and arrange the desired tote multiplicity value for each SKU in each SVC for product decanting to storage and fulfillment in a simulation, wherein the SKU multiplicity value for each SVC is based upon operational data stored in the memory module, and awarding numerical penalties and positive rewards based upon evaluated results of the corresponding products decanted into selected quantities of totes for storage and the completion of fulfillment activities.

12. The method of claim 11, wherein the operational data is at least one of:

operational data recorded during performance of operational tasks within the warehouse;

simulation data configured to simulate warehouse operations; and synthetic data configured to mimic the operational data.

13. The method of claim 11, wherein the SKU multiplicity values for each SVC correspond to an historical day's decanting of corresponding products for storage and fulfillment activities completed on that day.

14. The method of claim 10, wherein the warehouse comprises at least one storage system configured for storing the totes containing the decanted products, wherein each of the at least one storage system is configured to provide access to the stored totes for order fulfillment activities after the decanting.

15. The method of claim 10, wherein the plurality of priorities for optimal operation of the warehouse comprises at least one of: maintaining the total quantity of totes in storage below a maximum value threshold, and balancing a storage fill rate against episode length, wherein the storage fill rate and the episode length are opposing and result in opposing negative penalties, wherein the first product is additionally decanted into at least one tote retrieved from the storage already containing first products when the quantity of totes containing the first product is determined to be above a threshold value with respect to the first SVC multiplicity value.

16. The method of claim 10 further comprising retraining the SKU multiplicity control after a selected time interval or when a measured metric is determined to be outside of an operational window.

17. The method of claim 10, wherein the SKU multiplicity values for tote multiplicities are for product decanting by decanters, and wherein the decanters are human decanters and/or robotic decanters.

18. A non-transitory computer-readable medium comprising one or more instructions which, if executed by a controller, cause the controller to perform operations comprising:

receiving operational data from a warehouse system, the operational data comprising historical data and real-time data, the warehouse system configured to facilitate decanting of corresponding product in a selected quantity of totes for storage;

issuing, based on the operational data, respective SKU multiplicity values for each of a plurality of SKU velocity classes (SVCs) using a multiplicity artificial intelligence (AI) model, wherein each respective SKU multiplicity value defines a minimum quantity of totes into which each corresponding product is to be decanted into, wherein the decanting of a first product corresponds to a first SVC multiplicity value such that the first product is decanted into empty totes for storage, and wherein the first product is additionally decanted into at least one tote retrieved from the storage already containing first products when the quantity of totes containing the first product is determined to be above a threshold value with respect to the first SVC multiplicity value;

wherein the multiplicity AI model comprises at least one or more of a context bandit algorithm, a multi-armed bandit (MAB) algorithm, or machine learning algorithm and is retrained by using the operational data to retrain and update an SKU multiplicity control configured to define the SKU multiplicity value recommendation.

19. The non-transitory computer-readable medium of claim 18 further comprising updating the SKU multiplicity control and retraining the SKU multiplicity control based upon a plurality of priorities for optimal operation of the warehouse system.

20. The non-transitory computer-readable medium of claim 18, further comprising retraining the SKU multiplicity control by providing the control with a plurality of SKU multiplicity values for each SVC for the SKU multiplicity control to coordinate and arrange the desired tote multiplicity value for each SKU.

* * * * *